3,181,985
PROCESS FOR PRODUCING PAPER-LINED
BY-PRODUCT GYPSUM PRODUCTS
William H. Gates, Whippany, and Robert L. Harris, Morris Township, Morris County, N.J., assignors to Allied Chemical Corporation, New York, N.Y., a corporation of New York
Filed Sept. 7, 1960, Ser. No. 54,428
2 Claims. (Cl. 156—39)

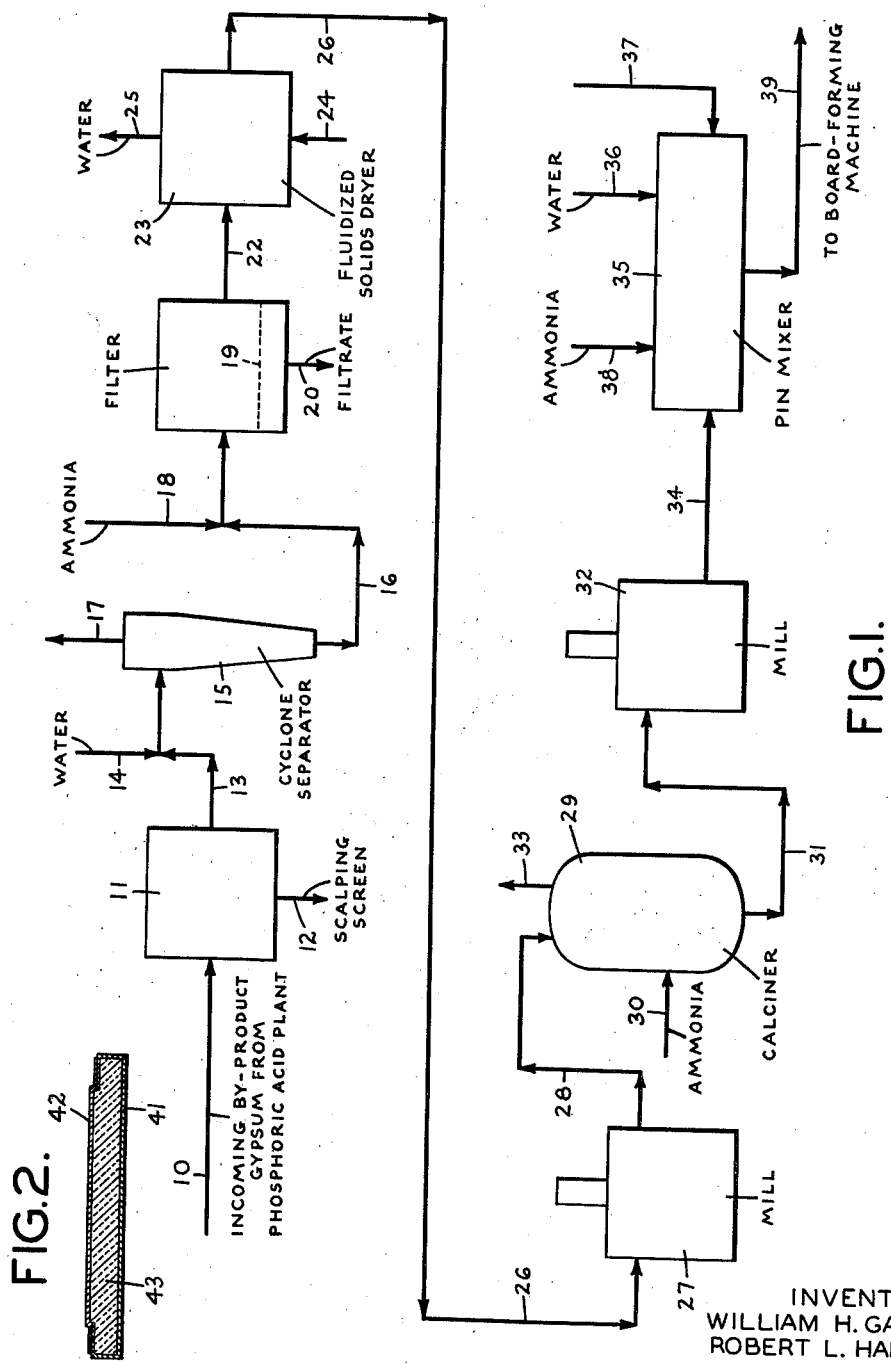

This invention relates to paper-lined by-product gypsum products and more particularly to a new and improved method for producing same.

Co-pending Stasse patent application Serial No. 698,703, filed November 25, 1957, now U.S. Patent 3,047,447, relates to the use of ammonia for neutralizing acid-containing by-product gypsum and the bonding of such neutralized gypsum to paper to form paper-lined gypsum products, for instance gypsum board. The ammonia-neutralization of the by-product gypsum prior to bonding the gypsum to paper in accordance with this co-pending application is a considerable improvement in the art for the reason that it achieves excellent bonding of the by-product gypsum to paper, whereas use of the prior art neutralizing agents such as lime, sodium carbonate, sodium bicarbonate, sodium hydroxide and calcium carbonate for neutralizing the acid-containing by-product gypsum was unsatisfactory because resulting in either no bonding or poor bonding of the gypsum to paper. In connection with the ammonia neutralization and preparation of the wallboard plaster mix, water is employed in excess of that required for converting the calcined gypsum to fully hydrated gypsum. The water in excess of the stoichiometric requirement is needed principally to induce fluidity in the mixture of calcined gypsum and minor associated components and thus make possible the shaping of the mixture between the paper liners to form the board. During the setting of the gypsum in the newly formed board a considerable quantity of the water not chemically required migrates to the boundary of the gypsum core of the board where it contacts the inner surfaces of the paper liners with subsequent deleterious effects. The excessive wetting of the paper liners detracts from strength of the critical mechanical bond between gypsum crystals and paper fiber and causes undesirable distortion of the planarity of the paper liners and formation of water streaks on the visible surface of the board.

The apparent rejection of water by the setting wallboard core, or, in other words, the failure of the liquid water to remain within the boundaries of the gypsum mass until escaping by vaporization is a phenomenon peculiar to by-product gypsum which does not ordinarily occur with calcined gypsum from crushed and milled natural gypsum rock. In an effort to overcome this undesirable rejection of water by the by-product gypsum during setting we tried various procedures including milling the gypsum either prior to or after calcination. In the milling either prior to or after calcination we also tried milling the gypsum to various degrees of fineness as measured by screen analyses and specific area determinations. In each case the pre-calcination milled or post calcination milled gypsum in its calcined form was tested as an ammonia-neutralized wallboard plaster mix in paper liners. In these tests the gypsum core always behaved in the same way in apparently rejecting part of the water required for fluidization with consequent wetting of the surfaces of the paper liners.

One object of the present invention is to provide a method for forming paper-lined by-product gypsum products wherein the water requirements of the calcined gypsum for forming a workable paste for bonding to the paper are considerably decreased.

Another object is to provide a method for forming paper-lined by-product gypsum products characterized by a considerably improved water retentivity of the calcined gypsum during setting.

Another object is to provide paper-lined by-product gypsum products, for instance by-product gypsum board, free of distortion of the planarity of its paper liners and free of water streaks in the liners.

A further object is to provide paper-lined by-product gypsum products, for instance by-product gypsum board, characterized by the paper not deteriorating prematurely, being free of undesirable yellowing, not becoming substantially embrittled after prolonged periods, and capable of being painted without subsequent discoloration of the painted surfaces.

Additional objects and advantages will be apparent as the invention is hereafter described in detail.

We produced gypsum board having strong and uniform bonding between the gypsum and paper following the method set forth in the co-pending Stasse application, now U.S. Patent 3,047,447, involving dewatering the aqueous slurry of acid-containing by-product gypsum, calcining the gypsum to partially remove its water of hydration and liberate the occluded acid, pulverizing the calcined gypsum, neutralizing the gypsum with ammonia, and applying a settable slurry of the ammonia-neutralized calcined gypsum and water to the paper liners as set forth in the co-pending Stasse application, now U.S. Patent 3,047,447. However, in accordance with the present invention, we found that if in addition to the ammonia neutralizing the gypsum was subjected to the combination of both a pre-calcination milling after dewatering and a post-calcination milling to obtain a more finely-divided gypsum of considerably increased surface area, preferably to a particle size having a Blaine surface area of about 4500 square centimeters or higher per gram of the milled calcined gypsum, that this gypsum was characterized by having an improved water management and (1) requiring decreased quantities of water for forming a workable paste for application to paper; and (2) having an improved water retentivity during setting without rejecting material quantities of its water of crystallization and hence without migration of discarded water to the inner surfaces of the paper liners to wet the liners. This property of the pre- and post-calcination milled gypsum which has been ammonia neutralized of requiring relatively small amounts of water to form a workable paste for application to paper was unexpected and surprising as it was assumed that considerably increasing the surface area of the gypsum would require increased amounts of water to lubricate the additional surfaces. The improved water retentivity exhibited by the pre- and post-calcination milled gypsum was also unexpected and surprising.

Neutralization of the acid in the by-product gypsum with ammonia is preferably carried out both prior to calcination to neutralize the free acid and during or after calcination, advantageously during calcination, to neutralize the acid which was trapped within the crystal structure of the gypsum and liberated by calcining. Less preferably, the ammonia neutralization prior to calcining can be omitted and the acidulous gypsum neutralized by treatment with ammonia in a single stage either during calcination or after calcination during formation of the plaster or core mix for making product desired.

The paper-lined gypsum products obtained by this invention are characterized by being (1) free of undesirable distortion of the planarity of the paper liners or rippling of the liners; (2) free of water streaking of the paper liners; (3) the desired dimensions of the paper-lined products being maintained; (4) the paper being free of undesirable yellowing; (5) the paper not deteriorating prematurely and not becoming substantially embrittled after prolonged periods; and (6) the product being readily painted without subsequent discoloration of the painted surfaces. Further, the invention provides a commercially advantageous outlet for the available large quantities of acid-containing by-product gypsum at the phosphoric acid plants, which frequently was a waste product to many producers, had low value, and presented serious disposal and corrosion problems.

The term "by-product gypsum board" is used in a broad sense herein to include gypsum wallboard, gypsum lath, plaster board, gypsum sheathing, etc. produced using by-product gypsum treated in accordance with the present invention.

For a more complete understanding of the invention, reference is made to the accompanying drawings wherein:

FIG. 1 is a diagrammatic flow sheet for carrying out the method of this invention including the ammonia neutralization and pre- and post-calcination milling of the by-product gypsum.

FIG. 2 is a transverse sectional view through the improved gypsum board of this invention.

In a specific embodiment of the present invention and with reference to the flow sheet of FIG. 1, acid-containing by-product gypsum from the last stage filter of the phosphoric acid plant is passed as an aqueous slurry through line 10 to conventional scalping screen 11. This acid-containing gypsum is obtained as a by-product of the wet process for production of phosphoric acid by the digestion or action of sulfuric acid on crude phosphate rock. A typical composition of this by-product gypsum is as follows.

| Component: | Content, wt. percent |
|---|---|
| $CaSO_4 \cdot 2H_2O$ | 96.0 |
| Combined water | 20.25 |
| $CaHPO_4$ | 0.9 |
| $H_3PO_4$ | 0.7 |
| $R_2O_3$ (Al and Fe) | 1.5 |
| $SiO_2$ | 1.1 |
| $CaF_2$ | 0.8 |

The by-product gypsum is generally accompanied by particulate carbonaceous material that has its source in the roasted phosphate rock used in the wet process for production of the phosphoric acid. In addition to the phosphoric acid impurity, this gypsum may also contain small amounts of sulfuric acid and, depending on the impurities present in the phosphate rock, hydrofluoric acid and hydrochloric acid. The by-product gypsum is in the form of relatively large single crystals as a result of a carefully controlled wet process aimed at a high filtration rate. A representative screen analysis of the by-product gypsum is as follows.

| Mesh size, U.S.: | Passing, wt. percent |
|---|---|
| −50 | 99 |
| −70 | 96.5 |
| −100 | 88 |
| −140 | 75 |
| −200 | 43 |
| −325 | 28 |

The acid-containing gypsum is screened by conventional scalping screen 11 which retains on the screen and removes oversize gypsum particles of size above about 500 microns which may block the liquid cyclones used in the washing step if not removed. A secondary benefit achieved by the screening on scalping screen 11 is a removal of a major portion of the silica since much of the silica is present as larger crystals (+70 mesh). If desired, the oversize particles separated by scalping screen 11 can be ground and recycled to the incoming by-product gypsum. The oversize particles are withdrawn from the scalping screen 11 through line 12 and the remaining desired size gypsum material passing through the screen is withdrawn through line 13.

Water is added to the gypsum slurry flowing in line 13 through line 14 and the resulting mixture is introduced tangentially into the upper portion of liquid cyclone separator 15. Washing is carried out in cyclone separator 15 to achieve removal of the carbonaceous material and also a portion, typically from about 60–90% of the free acid. One washing in cyclone separator 15 removes a major portion, generally more than 80% of the particulate carbonaceous material. If desired, the washed gypsum withdrawn from separator 15 can be further reduced in carbonaceous material content by re-slurrying same with water and passing the slurry into a second liquid cyclone separator. The cyclone separators rely on centrifugal force to split the gypsum slurry feed into two streams, the centrifugal force throwing the solid gypsum particles out against the side wall whereby they drop to the bottom of the separator. The washed gypsum particles are then collected and withdrawn from the separator bottom through line 16 and the carbonaceous material, acid, water and a small amount of gypsum are removed through line 17. A secondary benefit from washing in the cyclone separator is that gypsum is concentrated in the underflow stream making this stream more suitable for filter feed. The liquid cyclone separators are conventionally made of nylon and are enclosed in a stainless steel housing, which materials give good corrosion resistance. Less preferably, the washing could be accomplished in thickeners or hydro-separators.

Ammonia is added to the washed gypsum slurry flowing in line 16 as liquid aqueous ammonia, i.e. as ammonium hydroxide or as liquid anhydrous ammonia through line 18, the amount of ammonia added being sufficient to neutralize the free phosphoric acid remaining in the slurry to form the ammonium salt of the phosphoric acid and to bring the pH of the slurry to preferably between 8 and 10, more preferably between 9 and 10. The ammonia could also be added in liquid or gaseous anhydrous form, if desired, preferably as ammonia gas when anhydrous ammonia is utilized. The neutralization at this point does not effect the acid occluded in the gypsum crystals, the occluded acid typically representing about one-third of the total acid content in the gypsum prior to washing and subsequently liberated during calcination. Ammonia is employed as the neutralizing agent because it does not interfere with and destroy paper adhesion which is the situation with use of the prior art neutralizing agents. On the contrary the ammonia neutralization results in formation of fine needle-like by-product gypsum crystals similar to those of natural gypsum as contrasted with the coarse plate-like crystals produced by use of the prior art neutralizing agents, the fine needle-like crystals showing excellent bonding to paper with a strong and uniform bond. Less preferably the ammonia can be added prior to the washing. An excess of ammonia over the stoichiometric requirement for reaction with the phosphoric acid is preferably added during this neutralization to insure the desired degree of neutralization, such excess having no harmful effect on the gypsum and being vaporized during subsequent drying.

The ammonia-neutralized gypsum slurry is then introduced into filter 19 and dewatered to remove a major portion, leaving only about 10–15% free water based on the gypsum content. Alternatively the dewatering can be carried out in a centrifuge wherein gypsum of moisture content as low as about 7–8% can be obtained. Filter 19 is preferably constructed of stainless steel. The aqueous filtrate is withdrawn through line 20 and the partially dewatered gypsum through line 22 and introduced into drier 23. Drier 23 is a fluidized solids drier which achieves maximum thermal efficiency and improved temperature and dust control. A stream of heated air at typical temperature of about 900° F.–1300° F. is continuously introduced into drier 23 through line 24 and passed upwardly through the gypsum particles to further reduce their moisture content. If desired, other inert heating gas could be used instead of air such as, for instance flue gas as from the combustion chamber of a calcination kettle or plant boiler. The heating gas together with the water and a small amount of gypsum pass out of drier 23 through line 25. The water content of the gypsum is reduced to typically about 0.1–1% in drier 23. If desired, a rotary drier could be employed instead of the fluidized solids drier. The drier and equipment associated with the drier, especially where condensation may occur is preferably of stainless steel or ceramic material for purposes of heat and corrosion resistance.

The dry gypsum is withdrawn from drier 23 by conveyor 26 which may be a belt conveyor or other suitable conveyor and transferred for pre-calcination milling into mill 27 which is a roller mill. While a roller mill is preferred, hammer mills could be used to accomplish the grinding. The gypsum is milled in mill 27 to obtain a finely divided gypsum preferably having a Blaine surface area of at least 1800 cm.²/g. The gypsum from mill 27 has a representative particle size distribution as follows.

| Mesh size, U.S.: | Passing, wt. percent |
|---|---|
| −50 | 100 |
| −70 | 99.5 |
| −100 | 98.5 |
| −140 | 89.5 |
| −200 | 70.5 |
| −325 | 28.5 |

The finely-divided gypsum is withdrawn from mill 27 and transferred by conveyor 28, for instance a belt conveyor or other suitable conveyor well known in the art into calciner 29, which is a calcining kettle wherein the gypsum is calcined to liberate the occluded acid and expel water of hydration to produce calcium sulfate hemihydrate. It is advantageous that the gypsum be calcined to a temperature of at least 196° C. which is the beginning of the anhydrite temperature flat.

Ammonia may be added to the gypsum while in calciner 29 as liquid aqueous ammonia, i.e. as ammonium hydroxide or as liquid anhydrous ammonia through line 30 to neutralize the liberated acid. Generally two or more calcining kettles are employed. All or part of the necessary ammonia can be added to the plaster ingredients in the pin mixer hereafter described instead of or in addition to being added in the calcining kettle. The ammonia is introduced into calciner 29 or into the pin mixer or both in amount sufficient to neutralize the liberated phosphoric acid to form the ammonium salt of the phosphoric acid in the gypsum, and to bring the pH of the gypsum to between 6 and 10, preferably between 8 and 9.5. Preferably the ammonia is introduced in amount in excess of the stoichiometric requirement for reaction with the phosphoric acid to insure attaining the desired degree of neutralization, such excess ammonia causing no harmful effects. Only by neutralizing the acid in the by-product gypsum with ammonia together with the pre- and post-calcination milling in accordance with the invention is the improved quality set plaster achieved.

The calcined gypsum, also referred to as stucco is withdrawn from calciner 29 and transferred by conveyor 31 such as a belt conveyor or other suitable conveyor well known in the art into a second mill 32, also a roller mill. Expelled hydration water and a small amount of stucco passes out of calciner 29 through line 33. Hammer mills or tube mills can be employed instead of the roller mill. The stucco is milled in mill 32 to obtain the beneficial and unexpected result of (1) considerably lowering the water requirements of the stucco for forming a workable paste for application to paper while considerably increasing the surface area of the stucco generally more than doubling its surface area, and (2) markedly improving the water retaining characteristics of the stucco during setting. This improved water retentivity of the stucco eliminates the characteristic undesirable property of by-product stucco to reject a material quantity of its water of crystallization during setting with attendant migration of the rejected water to the surfaces of the paper liners to wet the liners. The Blaine surface area of the calcined gypsum or stucco is increased during the post-calcination milling to at least about 4500 square centimeters per gram of the milled calcined gypsum and typically to within the range of about 4500–6600 square centimeters per gram of the milled calcined gypsum. The gypsum has a representative particle size distribution before and after post-calcination milling in mill 33 as follows.

| Mesh Size, U.S. Standard | Passing, wt. percent | |
|---|---|---|
| | Before milling | After milling |
| −50 | 100 | 100 |
| −70 | 99.5 | 100 |
| −100 | 97 | 98.5 |
| −140 | 89 | 95.5 |
| −200 | 76 | 80.5 |

However, the preferred method for expressing particle size of stucco is by its Blaine surface area for the reason that below 200 mesh particle size, the screen analysis is less reliable for determining particle size. It is necessary to mill the gypsum both prior to and after calcination inasmuch as only by this combination of pre- and post-calcination milling in accordance with the invention are the improved results achieved. Finer grinding at either point does not achieve the improved results achieved by the pre-and post-calcination milling.

The Blaine surface area of the calcined gypsum is determined by the use of a Blaine air permeability apparatus as described in ASTM procedure C204–55. In the determination, a perforated disk is placed in the permeability cell of the apparatus and covered with a piece of filter paper cut to size with a standard cylindrical knife. A sample of 2.3050 grams of the calcined gypsum calculated to yield a final packed mass having a porosity of 0.50 is weighed on an analytical balance and charged to the permeability cell. A piece of filter paper cut as before is placed on top of the charge, and the charge then compressed to a fixed volume with the standard plunger of the apparatus. The air permeability cell is then attached in place and the liquid is drawn up to the top line of the manometer with a suction pump. The stop watch is started when the liquid level of the manometer passes the prescribed mark and the stop watch is stopped when the liquid level passes the next line. The Blaine surface area is then calculated by substituting the time shown by the stop watch in seconds into the following equation:

$$S = KT$$

where:
$S$ = surface area, cm.$^2$/gm.
$T$ = time, seconds
$K$ = constant, determined by standardizing apparatus with National Bureau of Standards Sample 114J of stated surface area (air permeability) 3310 cm.$^2$/g. measured at a porosity of 0.50

Table I shows the expected results of the water requirements of the by-product calcined gypsum for forming a workable paste for application to paper being raised when its surface area is increased by subjecting the gypsum to only pre-calcination milling.

*Table I*

| Gypsum Sample | Water Requirement | Blaine Surface Area Value, cm.$^2$/g. |
| --- | --- | --- |
| 1 | 68 | 5,170 |
| 2 | 66 | 4,700 |
| 3 | 65 | 4,600 |
| 4 | 64 | 4,450 |
| 5 | 60 | 4,100 |

The results given in Table I can be rationalized by assuming that with a given gypsum increasing the exposed surfaces requires increasing amounts of water to lubricate the additional surfaces.

Test data Tables II and III show the highly beneficial and surprising and unexpected results of the lowering of the water requirements of calcined gypsum, which has been subjected to both pre- and post-calcination milling in accordance with the invention, for bringing it to the consistency forming a workable paste for application to paper.

*Table II*

| Gypsum Sample | Pre-Calcination Milling | | Post-Calcination Milling | |
| --- | --- | --- | --- | --- |
| | Water Requirement, cc./100 g. | Blaine Surface Area, cm.$^2$/g. | Water Requirement, cc./100 g. | Blaine Surface Area, cm.$^2$/g. |
| 6 | 64 | 2,280 | 58 | 5,600 |
| 7 | 65 | 2,590 | 58 | 6,200 |
| 8 | 66 | 2,950 | 60 | 5,950 |
| 9 | 66 | 3,740 | 58 | 6,500 |
| 10 | 65 | 2,950 | 58 | 6,400 |
| 11 | 66 | 3,170 | 56 | 4,880 |
| 12 | 65 | 2,670 | 60 | 4,700 |

*Table III*

| Gypsum Sample | Milling | Blaine Surface Area, cm.$^2$/g. | Water Requirement, cc.H$_2$O/100 g. |
| --- | --- | --- | --- |
| 13 | Only Pre-calcination Milled | 2,280 | 64 |
| | Both Pre- and Post-calcination Milled | 4,400 | 58 |
| 14 | Only Pre-calcination Milled | 2,590 | 65 |
| | Both Pre- and Post-calcination Milled | 4,400 | 58 |
| 15 | Only Pre-calcination Milled | 3,200 | 66 |
| | Both Pre- and Post-calcination Milled | 5,950 | 60 |

The finely divided stucco is transferred from mill 32 by conveyor 34 such as a belt conveyor or other suitable conveyor well known in the art into pin mixer 35. Water is added to mixer 35 through line 36 and the usual accelerators, fillers, etc. are added through line 37. If desired to add the ammonia here it can be added through line 38. The core paste from pin mixer 35 is then passed through line 39 to the board-forming apparatus which is conventional apparatus. The settable slurry or paste is then placed between paper liners and allowed to set. The resulting paper-lined product is then dried.

Apparatus and procedure for preparing gypsum wallboard is described in detail in co-pending Stasse application Serial No. 698,703, filed November 25, 1957, now U.S. Patent 3,047,447. The settable paste or slurry of water and the ammonia-neutralized, pre- and post-calcined milled gypsum prepared in accordance with the present invention is deposited on a first paper sheet, the edges of the first sheet are folded to partially enclose the paste, a second paper sheet is continuously advanced, and paste is applied to edge portions of the advancing second sheet which will contact folded edge portions of the first sheet. The sheets with the slurry therebetween are then pressed together to form a bond of substantially uniform thickness, the core paste of the formed board then allowed to set and thereafter the board is subjected to drying operation.

Referring to FIG. 2 showing a gypsum wallboard, paper facer sheet 41 and paper backing sheet 42 adhere to gypsum core 43 by a strong and uniform bond. Core 43 is a shaped mass of interlocking fine needle-like crystals of by-product gypsum processed in accordance with the present invention including being ammonia-neutralized and pre- and post-calcination milled. Core 43 has a substantial amount of ammonium phosphate, the ammonia neutralization salt of the phosphoric acid initially present in the gypsum, dispersed throughout the crystal mass. The paper liners of this board were free of any discoloration and did not deteriorate or unduly embrittle after a period of a year.

In a plant operation, on a per hour flow basis, by-product gypsum slurry from the last stage filter of the phosphoric acid plant containing 46,000 lbs. of gypsum and 184,000 lbs. of water are conducted to the scalping screen and screened to remove oversize particles. The screened gypsum slurry is then admixed with 230,000 lbs. of additional water and introduced tangentially into the upper portion of a liquid cyclone separator and washed therein. 346,000 lbs. of water and a small amount of gypsum representing a 1% loss are withdrawn from the top of the cyclone separator, and 45,080 lbs. of washed gypsum together with 67,600 lbs. of water are withdrawn from the bottom of the cyclone separator. 23 lbs. of ammonia as ammonium hydroxide is added to the washed gypsum flowing in the line and the resulting admixture passed to a horizontal filter for dewatering. 45,080 lbs. of gypsum combined with 7,950 lbs. of water are removed from above the filter and introduced into a fluidized solids dryer. 7,950 lbs. of water and a small amount of gypsum representing a 1% loss are expelled from the top of the dryer and 44,630 lbs. of dried gypsum containing occluded phosphoric acid was withdrawn from the dryer and transferred to a roller mill for pre-calcination milling. The finely-divided gypsum having a Blaine surface area of about 1800–1900 cm.$^2$/g. is withdrawn from the mill and introduced into the upper portion of a calcining kettle wherein it is calcined to form calcium sulfate hemihydrate and liberate the occluded acid. 6,740 lbs. of water and a small amount of gypsum representing about a 1% loss are removed from the top of the calcining kettle, and 37,520 lbs. of stucco is withdrawn from the bottom of the calcining kettle and introduced into another roller mill for post-calcination milling. About 37,520 lbs. of calcined gypsum or stucco of more finely-divided particle size having Blaine surface area of about 4500–6500 cm.$^2$/g. is withdrawn from this second mill and transferred to a pin mixer for preparation of a settable slurry or paste for formation of gypsum board. 98 lbs. of ammonia is added to the pin mixer and water and conventional accelerators and fillers are also added to the materials in the pin mixer wherein the materials are mixed to produce suitable settable slurry or paste for formation of gypsum wallboard. The materials are mixed in pin mixer 36 to form a settable slurry having formulation as follows.

| Component | Consumption, lbs./1000 sq.ft. ⅜″ board |
|---|---|
| By-product stucco | 1250 |
| Waste paper | 12 |
| Pyrobar | 4 |
| $K_2SO_4$ | 8 |
| Soap | 1.1 |
| Starch | 9 |
| Ammonia | 2.9 |

Water volume to produce mix consistency (penetratration) between 30 and 40 mm.

The settable slurry was then withdrawn from the pin mixer and placed between paper liners as previously described followed by allowing the gypsum between the liners to set, and drying of the paper-lined product.

Although certain preferred embodiments of the invention have been disclosed for purpose of illustration, it will be evident that various changes and modifications may be made therein without departing from the scope and spirit of the invention.

What is claimed is:

1. In a process for producing paper-lined by-product gypsum products which includes calcining by-product gypsum containing residual phosphoric acid as an impurity, slurrying the calcined by-product gypsum with water, incorporating ammonia into the slurry prior to placing the slurry between paper liners to induce good bonding of the gypsum to paper, said ammonia being sufficient to bring the pH of the slurry prior to setting to between 6 and 10, applying a settable slurry of the ammonia treated gypsum and water between paper liners and allowing the slurry to set and form a strong bond of the gypsum to the paper liners, the combination therewith of milling said by-product gypsum containing residual phosphoric acid as an impurity prior to calcination to obtain a finely-divided gypsum and milling the calcined gypsum to obtain a finely-divided gypsum having a considerably increased Blaine surface area of at least about 4500 square centimeters per gram of the milled calcined gypsum and of improved water retentivity during setting without rejection of a material quantity of its water of crystallization with attendant migration of the rejected water to the surfaces of the paper-liners to wet the paper.

2. A process as claimed in claim 1 wherein the calcined gypsum is milled to obtain a finely-divided gypsum having a Blaine surface area within the range of 4500–6600 square centimeters per gram of the milled calcined gypsum.

References Cited by the Examiner

UNITED STATES PATENTS

| | | | |
|---|---|---|---|
| 1,001,350 | 8/11 | Caro et al. | 71—43 |
| 1,540,045 | 6/25 | Utzman. | |
| 1,548,358 | 8/25 | Edwards | 23—122 |
| 1,713,868 | 5/29 | Edwards | 23—122 |
| 1,900,381 | 3/33 | Hansen. | |
| 1,907,438 | 5/33 | Ober et al. | 71—40 |
| 1,932,956 | 10/33 | Crandell | 154—45.9 |
| 2,418,590 | 4/47 | Linzell et al. | 156—40 |
| 2,700,605 | 1/55 | Hornibrook | 71—40 |
| 3,047,447 | 7/62 | Stasse | 156—40 |

EARL M. BERGERT, *Primary Examiner.*

CARL F. KRAFFT, *Examiner.*